United States Patent
Wang et al.

(10) Patent No.: US 10,649,203 B2
(45) Date of Patent: May 12, 2020

(54) DISPLAY PANEL, DISPLAY DEVICE AND CONTROL METHOD THEREOF

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Kai Wang, Beijing (CN); Zhonghao Huang, Beijing (CN)

(73) Assignees: BOE TECHNOLOGY GROUP CO., LTD., Beijing (CN); CHONGQING BOE OPTOELECTRONICS TECHNOLOGY CO., LTD., Beibei, Chongqing (CN)

( * ) Notice: Subject to any disclaimer, the term of this patent is extended or adjusted under 35 U.S.C. 154(b) by 50 days.

(21) Appl. No.: 15/978,519

(22) Filed: May 14, 2018

(65) Prior Publication Data

US 2019/0094528 A1   Mar. 28, 2019

(30) Foreign Application Priority Data

Sep. 26, 2017   (CN) .......................... 2017 1 0884657

(51) Int. Cl.
G02B 26/08 (2006.01)
G02B 27/12 (2006.01)
G02B 27/10 (2006.01)
H02K 33/16 (2006.01)

(52) U.S. Cl.
CPC ..... G02B 26/0883 (2013.01); G02B 27/1006 (2013.01); G02B 27/126 (2013.01); H02K 33/16 (2013.01)

(58) Field of Classification Search
CPC .............. G02B 26/0883; G02B 27/126; G02B 27/1006; G02B 26/007; H02K 33/16
USPC ....................................................... 359/200.1
See application file for complete search history.

(56) References Cited

U.S. PATENT DOCUMENTS 5,185,660 A    2/1993  Um
2005/0231662 A1*  10/2005  Isozaki ................. G02F 1/1393
                                                         349/113
2015/0253626 A1    9/2015  Zhang et al.

FOREIGN PATENT DOCUMENTS

| CN | 1375716 A | 10/2002 |
|---|---|---|
| CN | 102129137 A | 7/2011 |
| CN | 103234153 A | 8/2013 |
| CN | 103487983 A | 1/2014 |
| CN | 103969719 A | 8/2014 |
| CN | 105093774 A | 11/2015 |

OTHER PUBLICATIONS

First Office Action for Chinese Application No. 201710884657.2, dated Nov. 4, 2019, 8 Pages.

* cited by examiner

Primary Examiner — Euncha P Cherry
(74) Attorney, Agent, or Firm — Brooks Kushman P.C.

(57) ABSTRACT

A display panel, a display device and a control method thereof are provided. The display panel includes a plurality of display units on a base substrate, each display unit includes: a driving component, and a light splitting component driven by the driving component to convert incident light into light of different colors.

16 Claims, 6 Drawing Sheets

DISPLAY PANEL, DISPLAY DEVICE AND CONTROL METHOD THEREOF

CROSS-REFERENCE TO RELATED APPLICATION

This application claims priority to Chinese Patent Application No. 201710884657.2 filed on Sep. 26, 2017, is incorporated herein by reference in its entirety.

TECHNICAL FIELD

The present disclosure relates to a field of display technology, and in particular to a display panel, a display device and a control method thereof.

BACKGROUND

With the rapid development of modern science and technology and the increasing demand for people's living production, more and more electronic devices have emerged to meet the ever-increasing demand for living and production, and display screens, as electronic devices in direct contact with people, has been widely used. The display screen, as a device capable of both outputting and inputting, is an important tool for visualizing the operation of the electronic device through a specific transmission device. Electronic devices such as televisions, mobile phones, computers, and smart wearable devices that are closest to us in life are inseparable from the display screen, some for operation, and others for viewing. The existing display screens currently on the market mainly include: LCD (liquid crystal display), LED (light emitting diode) display, plasma display, etc. Many display screen technologies have been developed for many years and the technology is mature, but there are also more or less problems, many problems are limitations of the technology itself, and cannot be solved by improving the solution, such as lacking of color expression (by RGB tri-color synthesis of other colors), complex component and inconvenient maintenance and so on.

SUMMARY

A display panel is provided in the present disclosure, including a plurality of display units on a base substrate, where each display unit includes: a driving component; and a light splitting component driven by the driving component to convert incident light into light of different colors.

Optionally, the driving component includes: a magnetic field generation component; a conductive coil in a magnetic field generated by the magnetic field generation component; and a rotary shaft connected to the conductive coil; where the light splitting component includes a prism connected to the rotating shaft capable of rotating the prism, and the prism is capable of converting the incident light into different colors of light at different rotation angles.

Optionally, the prism is a rectangular prism, and an extension direction of the rotary shaft is identical to an extension direction of an intersection line where two orthogonal surfaces of the rectangular prism intersect.

Optionally, the display unit further includes: a first light-shielding pattern at a light-incident side of the rectangular prism, where the first light-shielding pattern includes a first opening corresponding to the rectangular prism; a second light-shielding pattern at a light-emitting side of the rectangular prism, where the second light-shielding pattern includes a second opening opposite to the first opening.

Optionally, the rectangular prism includes a first orthogonal surface, a second orthogonal surface and an oblique surface connecting the first orthogonal surface and the second orthogonal surface; a first light-shielding coating is on the first orthogonal surface and configured to completely shield the first opening in the case that the rectangular prism is in an initial state.

Optionally, a second light-shielding coating is on an edge of the oblique surface of the rectangular prism adjacent to the first orthogonal surface of the rectangular prism.

Optionally, a third light-shielding coating is on an edge of the second orthogonal surface of the rectangular prism adjacent to the oblique surface of the rectangular prism.

Optionally, a fourth light-shielding coating is on an edge of the oblique surface of the rectangular prism adjacent to the second orthogonal surface of the rectangular prism.

Optionally, the magnetic field generation component includes two permanent magnets opposite to each other, and the conductive coil is between the two permanent magnets.

Optionally, the display panel further includes a signal transmission line connected to the conductive coil and configured to output a current to the conductive coil.

Optionally, the display panel further includes a first light-shielding pattern arranged at a light-incident side of the rectangular prism and having a plurality of first openings and a second light-shielding pattern arranged at a light-emitting side of the rectangular prism and having a plurality of second openings, where orthographic projections of the first openings onto the base substrate overlap orthographic projections of the second openings onto the base substrate.

Optionally, a shape of the first light-shielding pattern is identical to the second light-shielding pattern.

Optionally, the rectangular prism includes a first orthogonal surface, a second orthogonal surface and an oblique surface connecting the first orthogonal surface and the second orthogonal surface; a first light-shielding coating is on the first orthogonal surface, and an orthographic projection of the first light-shielding coating onto the base substrate overlaps the orthographic projection of the first opening onto the base substrate and the orthographic projection of the second opening onto the base substrate in the case that the rectangular prism is in an initial state.

A display device is further provided in the present disclosure, including the above display panel and a backlight source configured to provide backlight for the display panel.

Optionally, the display device further includes a signal transmission line connected to the conductive coil and configured to output a current to the conductive coil and a driving circuit configured to output different magnitudes of current to the signal transmission line.

A control method of the above display device is further provided in the present disclosure, including: controlling the driving component to drive the light splitting component to convert incident light into light of different colors.

Optionally, the control method further includes: controlling a magnitude of a current output to the conductive coil, to control a rotation angle of the prism.

DETAILED DESCRIPTION

In order to make the objects, the technical solutions and the advantages of the present disclosure more apparent, the present disclosure will be described hereinafter in a clear and complete manner in conjunction with the drawings and embodiments.

A display panel, a display device and a control method thereof are provided in the present disclosure, so as to solve the technical issue of lacking of color expression of the display screen in the related art.

A display panel is provided in some embodiments of the present disclosure, including a plurality of display units on a base substrate, where each display unit includes: a driving component; and a light splitting component driven by the driving component to convert incident light into light of different colors.

Specifically, under the driving of the driving component, the light splitting component can be switched among different states, and in different states, the split light component may convert the incident white light into different colors of light.

According to at least one embodiment of the present disclosure, the driving component drives the light splitting component to switch among different states. In different states, the light splitting component may convert the incident white light into light of different colors. The display panel in some embodiments of the present disclosure splits white light to obtain the color light rather than using RGB to synthesize colors, so the color purity is good. In addition, the color display may be performed just by the driving component and the light splitting component, therefore the circuit structure is simple, and the manufacturing process thereof is simple, and it is convenient for maintenance.

In some embodiments of the present disclosure, the driving component includes: a magnetic field generation component; a conductive coil 2 in a magnetic field generated by the magnetic field generation component; and a rotary shaft 3 connected to the conductive coil 2. The light splitting component includes a prism connected to the rotating shaft 3 capable of rotating the prism, and the prism is capable of converting the incident white light 11 into different colors of light at different rotation angles.

Optionally, the prism is a rectangular prism. Of course, the type of the prism is not limited, as long as the prism is capable of splitting white light into color light.

Figure 1:
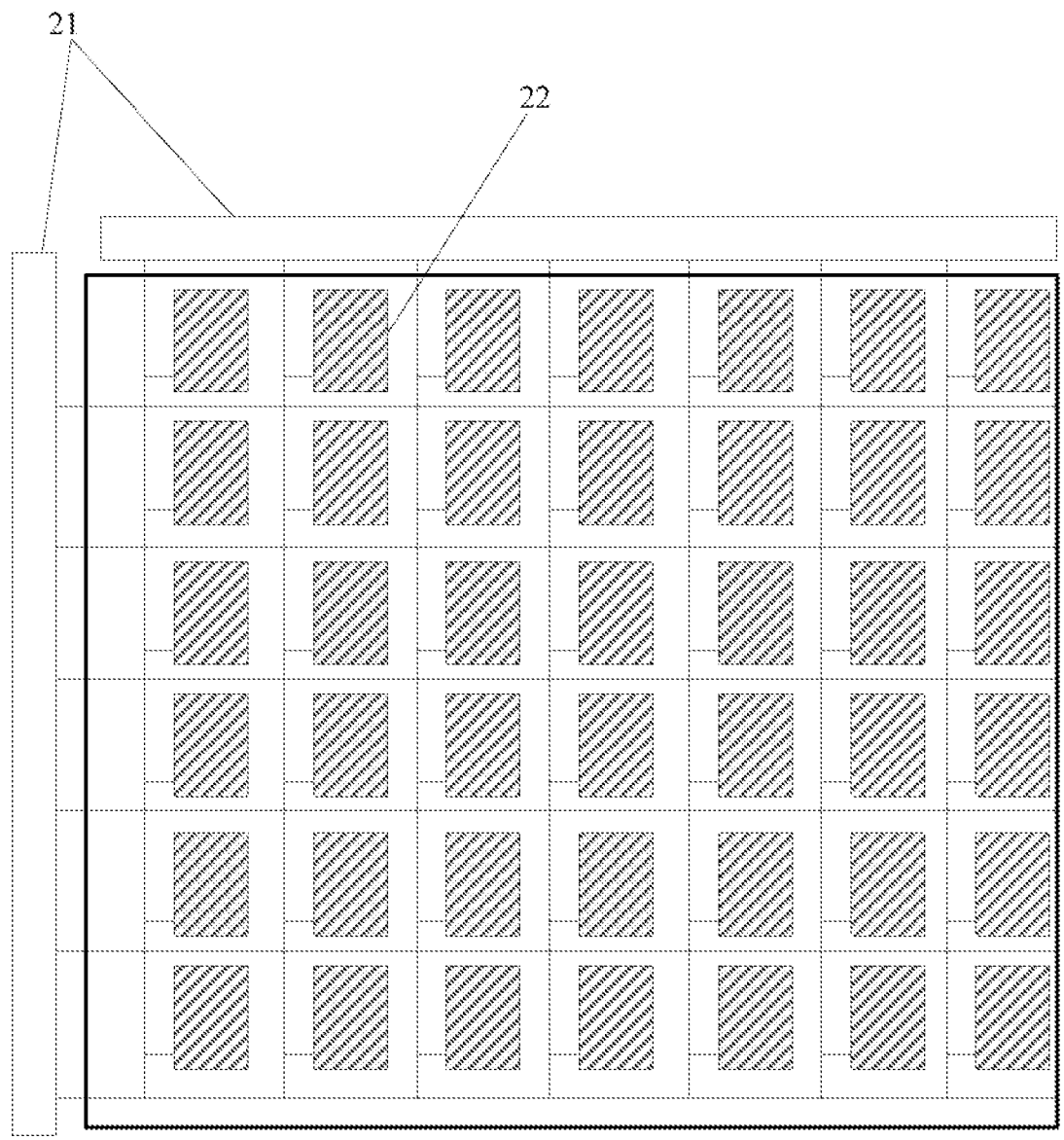
FIG. 1 is a plane view of a display panel in some embodiments of the present disclosure.
Figure 2:
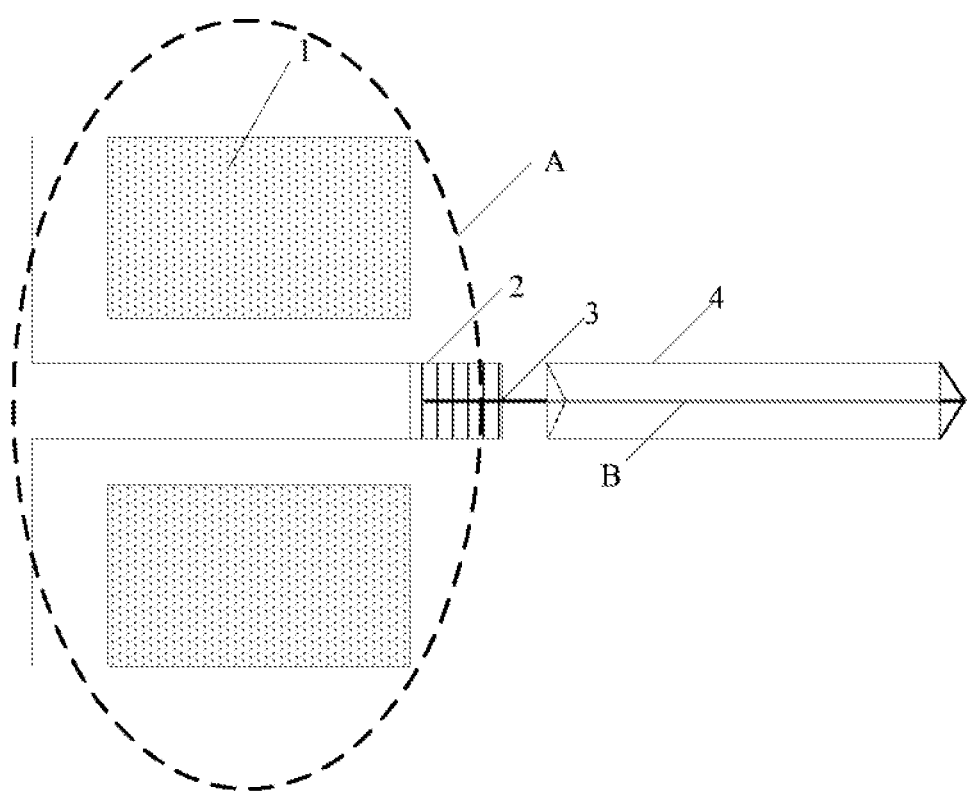
FIG. 2 is a schematic view of a driving component in some embodiments of the present disclosure.

As shown in FIG. 1 and FIG. 2, the driving circuit 21 may output a current to the conductive coil 2 in each display unit 22. According to the principle that the energized wire coil generates a moment in a magnetic field, by controlling the magnitude of current output into the conductive coil 2, the conductive coil 2 is controlled to rotate, so that the rotary shaft 3 may rotate, thereby driving the prism to rotate, so that the prism is capable of converting the incident white light 11 into different colors of light.

Optionally, as shown in FIG. 2, the magnetic field generation component A includes two permanent magnets 1 opposite to each other, and the conductive coil 2 is between the two permanent magnets 1. The prism is a rectangular prism 4, and an extension direction of the rotary shaft 3 is identical to an extension direction of an intersection line B where two orthogonal surfaces of the rectangular prism 4 intersect. The rectangular prism includes a two orthogonal surfaces and an oblique surface, and the intersection line B is where the two orthogonal surfaces of the rectangular prism 4 intersect.

Optionally, the display panel further includes a signal transmission line connected to the conductive coil 2 and configured to output a current to the conductive coil 2. The signal transmission line is connected to the conductive coil 2 and the driving circuit 21.

It can be seen from the above, according to the display panel in some embodiments, a series circuit is formed through the conductive coils in the magnetic field formed by the permanent magnets. Compared with the thin film transistor circuits of the display screen in the related art, the circuit structure is significantly simplified, the working principle is simpler, and the number of electrical elements in the pixel area is reduced, the composition is simpler, thereby reducing the design cost and maintenance costs for later maintenance, reducing the difficulty of poor analysis, and making it easier to be updated.

Figure 3:
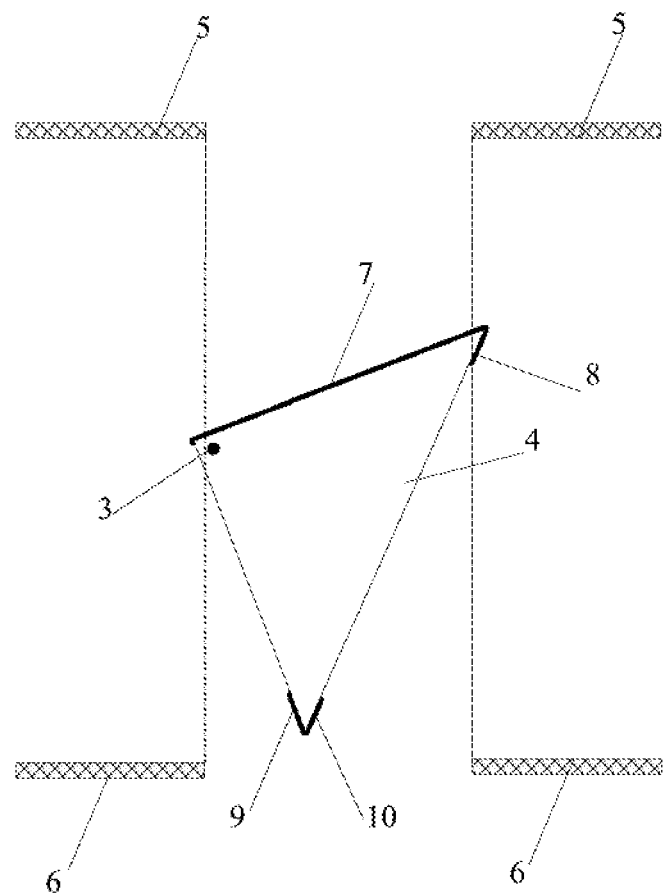
FIG. 3 is a schematic view of a display unit displaying a dark image in some embodiments of the present disclosure.
Figure 4:
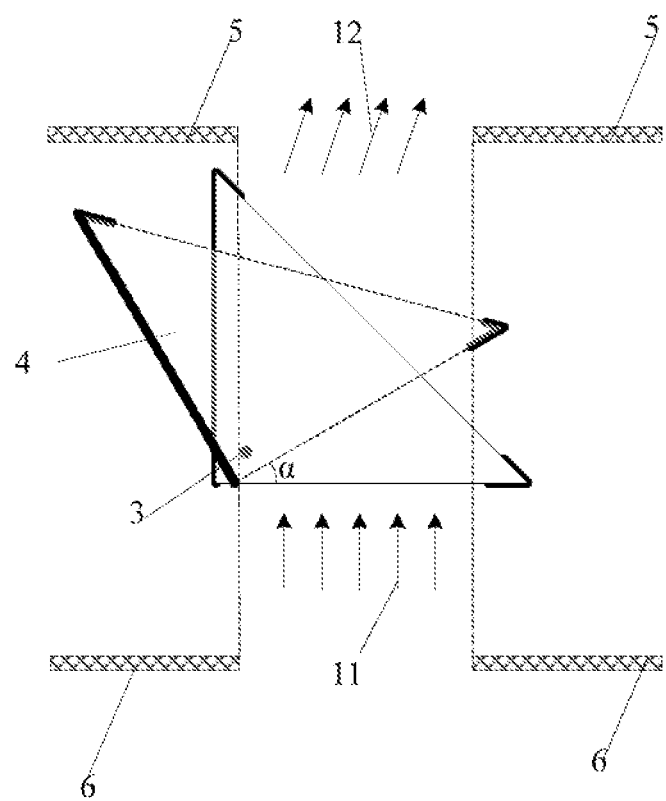
FIG. 4 is a schematic view of a display unit displaying a color image in some embodiments of the present disclosure.

As shown in FIG. 3 and FIG. 4, it is able to control a rotation angle of the rectangular prism 4 by controlling the magnitude of the current input to conductive coil 2, so as to control the color displayed by each display unit 22, so that the display panel displays the image. Due to the process limitations, the size of the prism cannot be very small. Therefore, the display panel in some embodiments may be applied to a large-scale public display screen, such as an advertisement display screen of a large commercial center.

In order to prevent the prism from being affecting by the backlight of other display units 22, as shown in FIGS. 3 and 4, the display unit 22 further includes a first light-shielding pattern 6 at a light-incident side of the rectangular prism 4, where the first light-shielding pattern 6 includes a first opening 13 corresponding to the rectangular prism 4. In order to prevent the prism from affecting by ambient light other than the backlight and thus affecting the display, as shown in FIGS. 3 and 4, the display unit 22 further includes a second light-shielding pattern 5 at a light-emitting side of the rectangular prism 4. The second light-shielding pattern includes a second opening 14 opposite to the first opening 13.

In order to enable the display unit 22 to display a dark image, as shown in FIGS. 3 and 4, a first light-shielding coating 7 is on the first orthogonal surface of the rectangular prism 4. In the case that the rectangular prism 4 is in an initial state shown in FIG. 3, the first light-shielding coating 7 is capable of completely shielding the first opening 13, so as to enable the display unit 22 to display a dark image.

For the display unit 22, it is necessary to have an original moment to make the prism to be in the initial state as shown in FIG. 3, and the white light 11 emitted by the backlight and through the first opening 13 is shielded by the first light-shielding coating 7 of the prism, then the display unit 22 is in the full black mode.

As shown in FIG. 4, when the prism splits the white light to perform the color display, the white light 11 emitted by the backlight enters from the first opening 13 and passes through the prism and then exits. In order to prevent interference of various refracted light, reflected light, transmitted light, and the like, as shown in FIG. 4 and FIG. 3, a second light-shielding coating 8 is arranged on an edge of the oblique surface of the rectangular prism 4 adjacent to the first orthogonal surface of the rectangular prism 4. In addition, a third light-shielding coating 9 is arranged on an edge of the second orthogonal surface of the rectangular prism 4 adjacent to the oblique surface of the rectangular prism 4. Moreover, a fourth light-shielding coating 10 is arranged on an edge of the oblique surface of the rectangular prism 4 adjacent to the second orthogonal surface of the rectangular prism 4. It is able to prevent interference of various refracted light, reflected light, transmitted light, and the like through the second light-shielding coating 8, the third light-shielding coating 9 and the fourth light-shielding coating 10.

By adjusting the current input into the conductive coil 2 by the driving circuit 21, the moment received by the prism may be changed so that the prism may rotate by a certain angle. In some embodiments of the present disclosure, as shown in FIG. 3 and FIG. 4, the rectangular prism 4 may rotate by an angle from 0 to α, and the rectangular prism 4 may split the white light 11 into different colors of the color light 12 within an angle ranging from 0 to α. Specifically, the correspondence between the rotation angle and the color of the light obtained by the light splitting may be determined in advance through a large number of experiments. When performing the display, the color of the light to be displayed is firstly determined, and then the rectangular prism 4 is controlled rotated by a corresponding angle. In the 0-α rotation angle range, the actual light splitting angle change may be very large, so the prism can split enough colors to be used. The value of a may be determined according to the required color light, and a is generally from 15° to 35°.

A display device is further provided in some embodiments of the present disclosure, including the above display panel and a backlight source configured to provide backlight for the display panel. Specifically, the backlight source may be a white light backlight source 16. The display device in some embodiments of the present disclosure may split the white light emitted by the white backlight source 16 to obtain color light rather than using RGB to synthesize colors, so the color purity is good.

Figure 5:
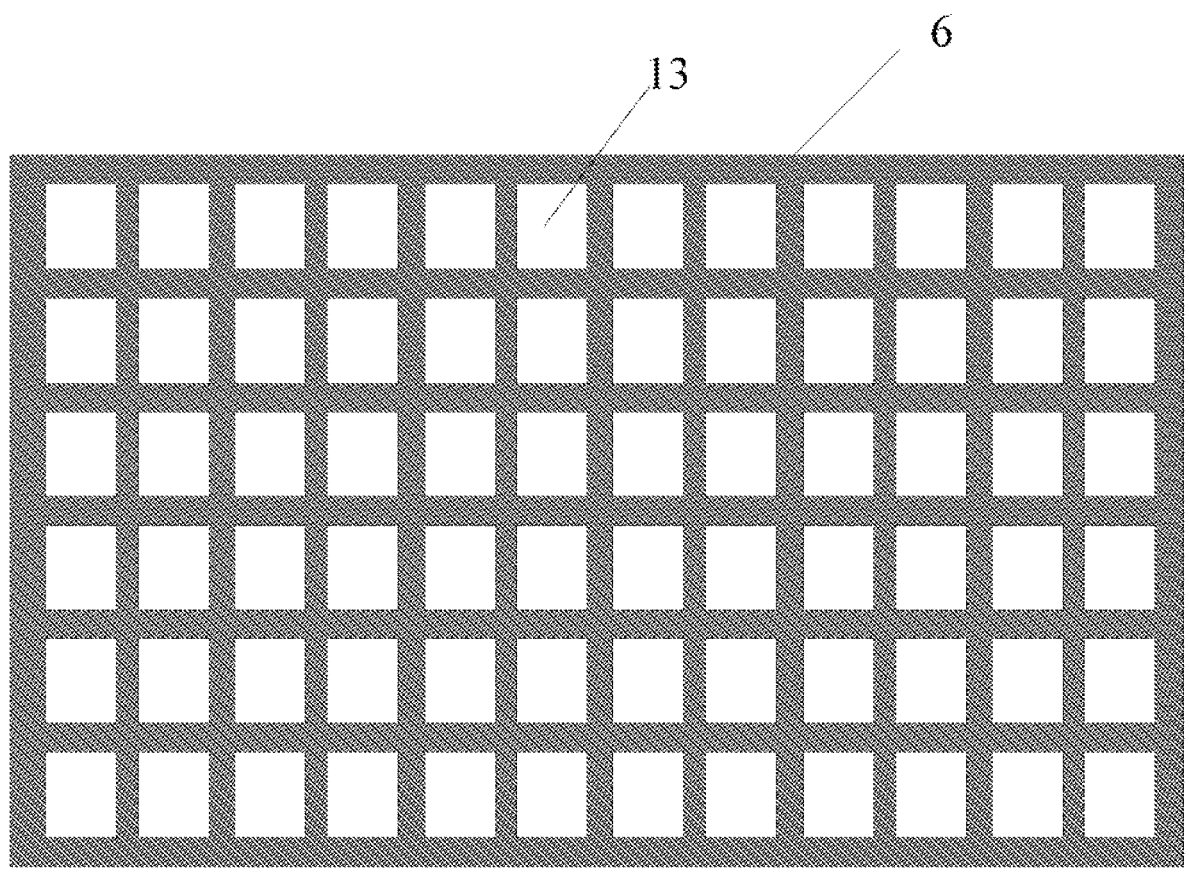
FIG. 5 is a schematic view of a first light-shielding pattern in some embodiments of the present disclosure.
Figure 6:
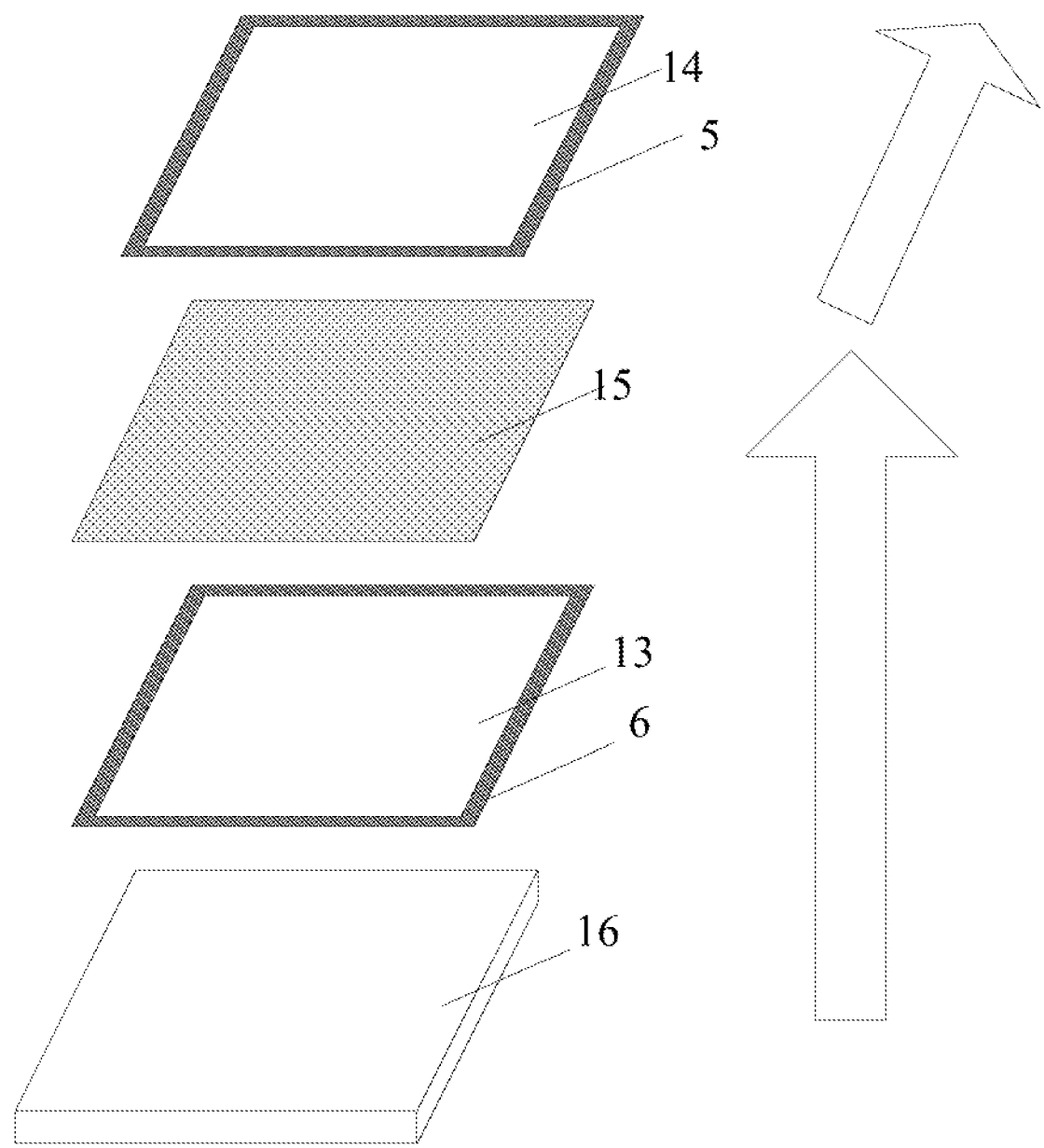
FIG. 6 is a schematic view of a display device in some embodiments of the present disclosure.

As shown in FIG. 6, the display device in some embodiments of the present disclosure includes the white backlight source 16, the first light-shielding pattern 6, a prism layer 15, and the second light-shielding pattern 5 stacked in sequence. As shown in FIG. 5, the first light-shielding pattern 6 has a plurality of first openings 13, and each first opening 13 corresponds to a prism. A shape of the second light-shielding pattern 5 is identical to the first light-shielding pattern 6, and the second openings 14 of the second light-shielding pattern 5 are in a one-to-one correspondence to the first openings 13 of the first light-shielding pattern 6. The prism layer 15 includes a plurality of prisms, and each prism corresponds to one first opening 13. After the light emitted by the white backlight source 16 passes through the first opening 13, the prism layer 15 and the second opening 14, it can be converted into a color light 12.

The display device in some embodiments of the present disclosure has a large aperture ratio in the pixel area and a high transmittance, and the power consumption of the backlight source may be significantly reduced. In addition, the structures of the first light-shielding pattern and the second light-shielding pattern are simple and practical, and the first light-shielding pattern is the same as the second light-shielding pattern, therefore they are easy to be aligned and replaced with each other.

Optionally, the display device further includes a driving circuit configured to output different magnitudes of current to the signal transmission line. Due to the process limitations, the size of the prism cannot be very small. Therefore, the display panel in some embodiments may be applied to a large-scale public display screen, such as an advertisement display screen of a large commercial center.

A control method of the above display device is further provided in some embodiments of the present disclosure, including: controlling the driving component to drive the light splitting component to convert incident light into light of different colors.

Optionally, the driving component is controlled to drive the light splitting component to switch among different states, so as to enable the light splitting component to convert the incident white light into light of different colors.

According to at least one embodiment of the present disclosure, the driving component drives the light splitting component to switch among different states. In different states, the light splitting component may convert the incident white light into light of different colors. The display panel in some embodiments of the present disclosure splits white light to obtain the color light rather than using RGB to synthesize colors, so the color purity is good. In addition, the color display may be performed just by the driving component and the light splitting component, therefore the circuit structure is simple, and the manufacturing process thereof is simple, and it is convenient for maintenance.

In some embodiments of the present disclosure, as shown in FIG. 6, the driving component includes: a magnetic field generation component; a conductive coil 2 in a magnetic field generated by the magnetic field generation component; and a rotary shaft 3 connected to the conductive coil 2. The light splitting component includes a prism connected to the rotating shaft 3. The control method further includes: controlling a magnitude of a current output to the conductive coil 2, to control a rotation angle of the prism.

The driving circuit 21 may output a current to the conductive coil 2 in each display unit 22. According to the principle that the energized wire coil generates a moment in a magnetic field, by controlling the magnitude of current output into the conductive coil 2, the conductive coil 2 is controlled to rotate, so that the rotary shaft 3 may rotate, thereby driving the prism to rotate, so that the prism is capable of converting the incident white light 11 into different colors of light.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A display panel, comprising a plurality of display units on a base substrate, wherein each display unit comprises:
    a driving component; and
    a light splitting component driven by the driving component,
    wherein the driving component comprises:
    a magnetic field generation component;
    a conductive coil in a magnetic field generated by the magnetic field generation component; and
    a rotary shaft connected to the conductive coil;
    wherein the light splitting component comprises a prism connected to the rotary shaft capable of rotating the prism, and the prism is capable of converting incident light into light in a plurality of colors at different rotation angles.

2. The display panel according to claim 1, wherein the prism is a rectangular prism, and an extension direction of the rotary shaft is identical to an extension direction of an intersection line where two orthogonal surfaces of the rectangular prism intersect.

3. The display panel according to claim 2, wherein the display unit further comprises:
 a first light-shielding pattern at a light-incident side of the rectangular prism, wherein the first light-shielding pattern comprises a first opening corresponding to the rectangular prism;
 a second light-shielding pattern at a light-emitting side of the rectangular prism, wherein the second light-shielding pattern comprises a second opening opposite to the first opening.

4. The display panel according to claim 3, wherein the rectangular prism comprises a first orthogonal surface, a second orthogonal surface and an oblique surface connecting the first orthogonal surface and the second orthogonal surface;
 a first light-shielding coating is on the first orthogonal surface and configured to completely shield the first opening in the case that the rectangular prism is in an initial state.

5. The display panel according to claim 4, wherein a second light-shielding coating is on an edge of the oblique surface of the rectangular prism adjacent to the first orthogonal surface of the rectangular prism.

6. The display panel according to claim 1, wherein the magnetic field generation component comprises two permanent magnets opposite to each other, and the conductive coil is between the two permanent magnets.

7. The display panel according to claim 1, further comprising a signal transmission line connected to the conductive coil and configured to output a current to the conductive coil.

8. The display panel according to claim 4, wherein a third light-shielding coating is on an edge of the second orthogonal surface of the rectangular prism adjacent to the oblique surface of the rectangular prism.

9. The display panel according to claim 4, wherein a fourth light-shielding coating is on an edge of the oblique surface of the rectangular prism adjacent to the second orthogonal surface of the rectangular prism.

10. The display panel according to claim 2, further comprising: a first light-shielding pattern arranged at a light-incident side of the rectangular prism and having a plurality of first openings and a second light-shielding pattern arranged at a light-emitting side of the rectangular prism and having a plurality of second openings, wherein orthographic projections of the first openings onto the base substrate overlap orthographic projections of the second openings onto the base substrate.

11. The display panel according to claim 10, wherein a shape of the first light-shielding pattern is identical to the second light-shielding pattern.

12. The display panel according to claim 10, wherein the rectangular prism comprises a first orthogonal surface, a second orthogonal surface and an oblique surface connecting the first orthogonal surface and the second orthogonal surface;
 a first light-shielding coating is on the first orthogonal surface, and an orthographic projection of the first light-shielding coating onto the base substrate overlaps the orthographic projection of the first opening onto the base substrate and the orthographic projection of the second opening onto the base substrate in the case that the rectangular prism is in an initial state.

13. A display device, comprising the display panel according to claim 1 and light source configured to provide backlight for the display panel.

14. The display device according to claim 13,
 further comprising:
 a signal transmission line connected to the conductive coil and configured to output a current to the conductive coil and a driving circuit configured to output different magnitudes of current to the signal transmission line.

15. A control method of the display device according to claim 13, comprising: controlling the driving component to drive the light splitting component to convert incident light into light in a plurality of colors.

16. The control method according to claim 15,
 further comprising:
 controlling a magnitude of a current output to the conductive coil, to control a rotation angle of the prism.

\* \* \* \* \*